United States Patent
Huang et al.

(10) Patent No.: US 12,452,976 B2
(45) Date of Patent: Oct. 21, 2025

(54) LIGHT SOURCE DRIVER

(71) Applicant: Renesas Design (UK) Limited, Bourne End (GB)

(72) Inventors: Weihai Huang, Bourne End (GB); Ze Han, Bourne End (GB)

(73) Assignee: Renesas Design (UK) Limited, Bourne End (GB)

( * ) Notice: Subject to any disclaimer, the term of this patent is extended or adjusted under 35 U.S.C. 154(b) by 0 days.

(21) Appl. No.: 18/558,068

(22) PCT Filed: Dec. 1, 2021

(86) PCT No.: PCT/CN2021/134857
§ 371 (c)(1),
(2) Date: Oct. 30, 2023

(87) PCT Pub. No.: WO2023/097578
PCT Pub. Date: Jun. 8, 2023

(65) Prior Publication Data
US 2024/0224397 A1    Jul. 4, 2024

(51) Int. Cl.
*H05B 45/397* (2020.01)
*G09G 3/32* (2016.01)

(52) U.S. Cl.
CPC .............. *H05B 45/397* (2020.01); *G09G 3/32* (2013.01); *G09G 2310/0264* (2013.01)

(58) Field of Classification Search
CPC ........ H05B 45/397; H05B 45/30; G09G 3/32; G09G 2310/0264; G09G 2320/064; G09G 2330/02; G09G 3/3406; Y02B 20/30
USPC ........................................................ 315/291
See application file for complete search history.

(56) References Cited

U.S. PATENT DOCUMENTS

| | | | |
|---|---|---|---|
| 2009/0102399 A1* | 4/2009 | Kita ....................... | H05B 45/50 315/307 |
| 2011/0127921 A1* | 6/2011 | Lin ........................ | H05B 45/46 315/192 |
| 2012/0188293 A1* | 7/2012 | Furukawa ............ | H05B 45/382 315/210 |
| 2013/0320857 A1* | 12/2013 | Fu ......................... | H05B 47/25 315/122 |

(Continued)

FOREIGN PATENT DOCUMENTS

| | | |
|---|---|---|
| CN | 103841725 A | 6/2014 |
| CN | 104883799 A | 9/2015 |
| CN | 106358337 A | 1/2017 |

(Continued)

OTHER PUBLICATIONS

International Search Report and Written Opinion dated Aug. 25, 2023 received in International Application No. PCT/CN2021/134857.

*Primary Examiner* — Ryan Jager
(74) *Attorney, Agent, or Firm* — SCULLY, SCOTT, MURPHY & PRESSER, P.C.

(57) ABSTRACT

A driver for use with a light source is presented. The driver includes a first circuit and a second circuit. The first circuit is adapted to control an amount of current flowing through the light source to switch the light source between a first state when the light source is on and a second state when the light source is off. The second circuit is adapted to generate a leak current so that during the second state the leak current flows through the light source.

16 Claims, 8 Drawing Sheets

(56) References Cited

U.S. PATENT DOCUMENTS

2021/0212183 A1* 7/2021 Zhou ................... H05B 45/397
2024/0224397 A1* 7/2024 Huang ................. H05B 45/397

FOREIGN PATENT DOCUMENTS

WO      2012168844 A2    12/2012
WO      2021008732 A1     1/2021

* cited by examiner

LIGHT SOURCE DRIVER

FIELD OF THE DISCLOSURE

The present disclosure relates to a light source driver, and in particular to a driver for use with a semiconductor light source.

BACKGROUND

In applications including LED back-lighting and classic LED lighting or display, an LED driver controls an LED current through a string of LED diodes using a power switch that switches the LED current on and off. The break voltage of the LED power switch metal-oxide semiconductor field-effect transistor (MOSFET) should be higher than the supply voltage provided at the positive terminal of the LED string. During the LED OFF state, there is no current through LED diodes, and the output port of the driver (LEDn PIN) is connected to the negative terminal of the LED string. As a result, the LEDn pin voltage is close to the supply voltage provided at the positive terminal of LED string. For example, for a string of 20 LED diodes connected in series, the maximum DCDC power supply is 65V, and the low side LED chip of the driver must be designed to sustain a high voltage, in this case the LED power switch must be able to sustain at least 65V. This increases the die size and the cost of production of the LED driver.

It is an object of the disclosure to address one or more of the above mentioned limitations.

SUMMARY OF THE DISCLOSURE

According to a first aspect of the disclosure, there is provided a driver for use with a light source, the driver comprising a first circuit adapted to control an amount of current flowing through the light source to switch the light source between a first state when the light source is on and a second state when the light source is off; and a second circuit adapted to generate a leak current so that during the second state the leak current flows through the light source.

The leak current may be generated actively or passively.

Optionally, the leak current is less than a threshold value such that the light source remains off in the second state. For instance the threshold value is set so that the leakage current is small enough and do not produce noticeable illumination.

Optionally, the first circuit comprises a regulation switch coupled to a current digital-to-analog converter.

Optionally, the regulation switch has a first terminal coupled to the second circuit, a second terminal coupled to the current digital-to-analog converter, and a control terminal.

Optionally, in the second state a voltage at the first terminal is less than a threshold value. For instance the threshold value may be determined by a voltage rating of the regulation switch.

Optionally, the second circuit is coupled in parallel with the first circuit. For instance the second circuit may form a current path between the first terminal of the regulation switch and ground.

Optionally, the second circuit comprises a current source coupled to a current mirror.

Optionally, the current mirror comprises a first switch coupled to the current mirror and a second switch coupled to a resistance.

Optionally, the second circuit comprises a clamping switch coupled to the current mirror.

Optionally, the second circuit comprises a plurality of Zener diodes coupled in series.

Optionally, the second circuit comprises a resistance coupled to the plurality of Zener diodes.

According to a second aspect of the disclosure there is provided a device comprising a driver according to the first aspect coupled to a light source.

Optionally, the light source is a semiconductor light source. For instance the semiconductor light source may comprise one or more LEDs.

Optionally, the device is a display device comprising a plurality of semiconductor light sources, each semiconductor light source among the plurality of light sources being coupled to a corresponding driver.

The device according to the second aspect of the disclosure may comprise any of the features described above in relation to the driver according to the first aspect of the disclosure.

According to a third aspect of the disclosure, there is provided a method of driving a light source, the method comprising
  controlling an amount of current flowing through the light source to switch the light source between a first state when the light source is on and a second state when the light source is off; and
  generating a leak current so that during the second state the leak current flows through the light source.

Optionally, the leak current is generated actively. For instance the leak current may be generated using a current source.

Optionally, the leak current is generated passively. For instance the leak current may be generated using one or more passive elements such as a plurality of Zener diodes.

The third aspect may share features of the first aspect, as noted above and herein.

DETAILED DESCRIPTION

The disclosure is described in further detail below by way of example and with reference to the accompanying drawings, in which:

FIG. 1 is a diagram of an LED driver coupled to a string of LEDs according to the prior art.

The string of LEDs 105 has an input terminal (positive terminal) for receiving an input voltage Vdcdc and an output terminal coupled to the LED driver 110. The driver 110 includes a regulation switch, also referred to as power switch, implemented as an N-type metal-oxide-semiconductor field-effect (MOSFET) transistor NM1. The switch NM1 has a drain terminal connected to the output terminal of the LED string 105 and a source terminal coupled to ground via a current digital to analog converter (IDAC).

In operation, the gate terminal of NM1 received a control signal Vgate to regulate a current Iled through the LED string 105 between an ON state and an OFF state. This may be achieved using pulse width modulation control. The voltage at the output (negative) terminal of the LED string 105 is Vled.

Figure 1:
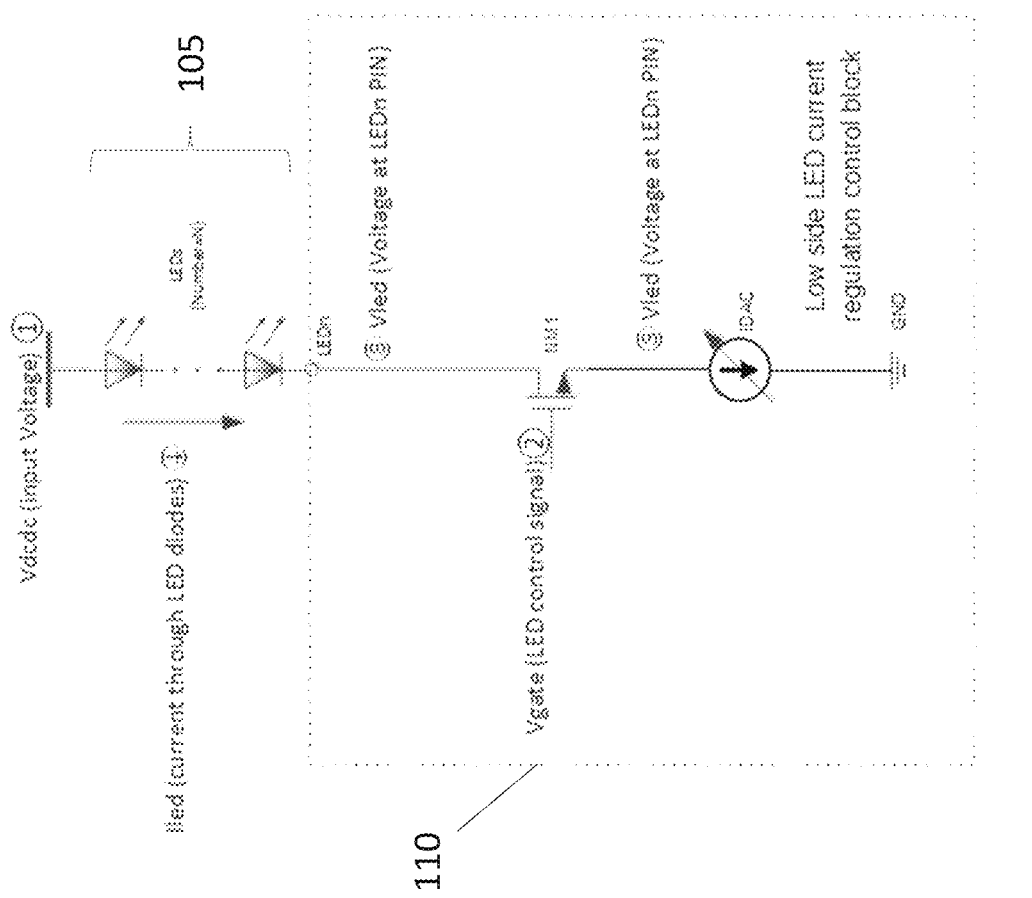
FIG. 1 is a diagram of an LED driver according to the prior art.
Figure 2:
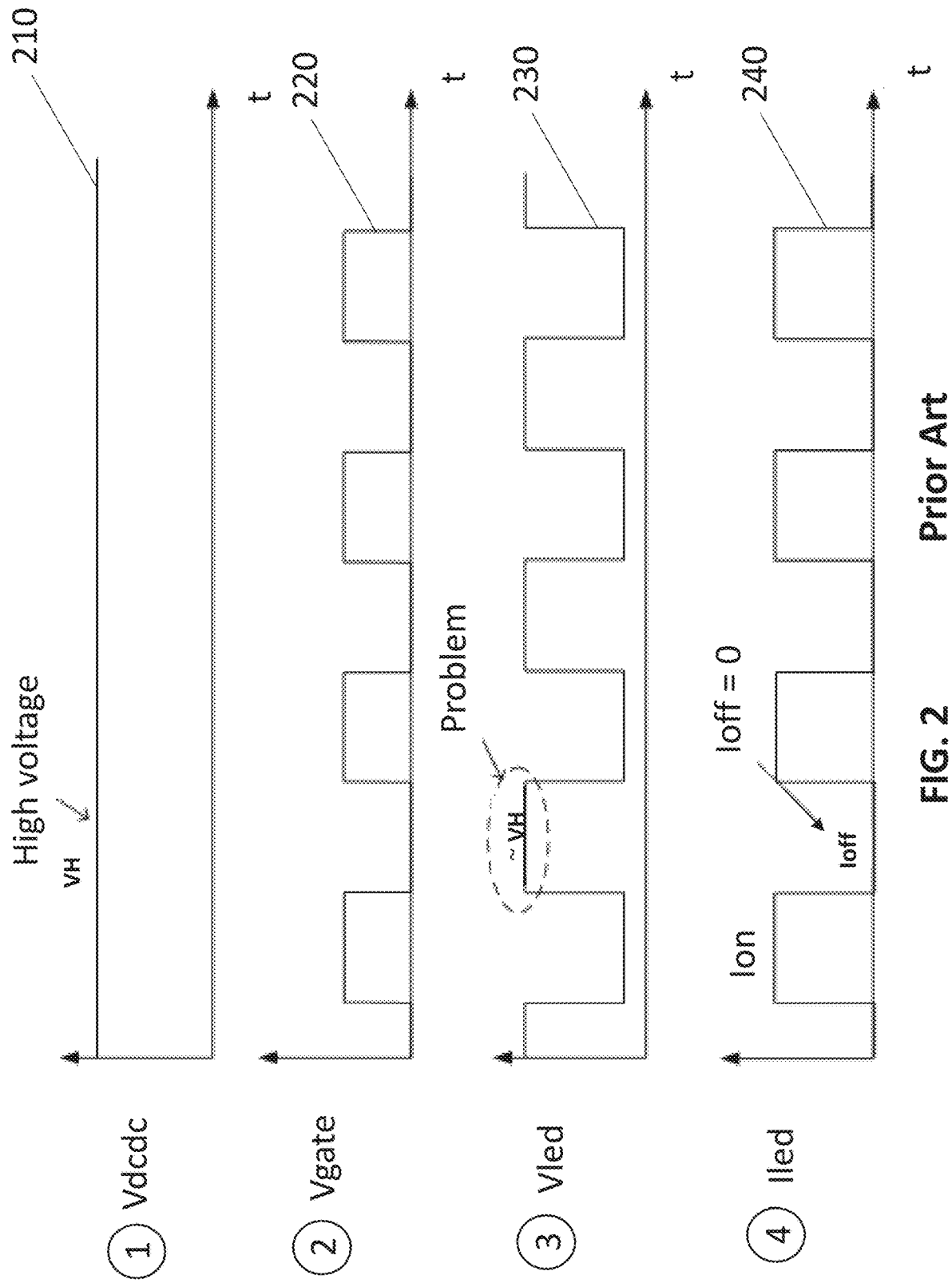
FIG. 2 is a waveform diagram illustrating the working of the LED driver of FIG. 1.

FIG. 2 is a waveform diagram illustrating the working of the LED driver of FIG. 1. FIG. 2 shows the input voltage Vdcdc 210, the gate voltage Vgate 220, the voltage Vled 230, and the LED current Iled 240. The gate voltage Vgate alternates between a high state and a low state. When Vgate is low, the switch NM1 is off (open). As a result the current Iled is about zero and the voltage Vled 230 is close to the input voltage Vdcdc. Consequently the regulation switch NM1 must be designed to sustain high voltages.

Figure 3:
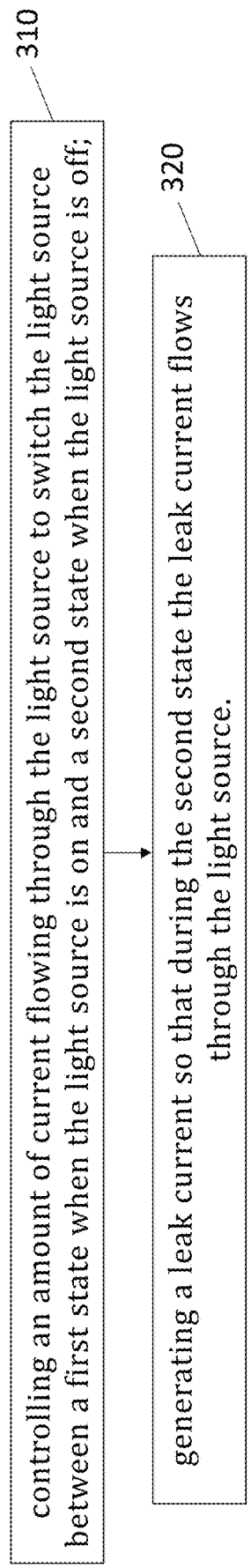
FIG. 3 is a flow chart of a method for driving a light source according to the disclosure.

FIG. 3 is a flow chart of a method for driving a light source according to the disclosure. At step 310 an amount of current flowing through the light source is controlled to switch the light source between a first state when the light source is on and a second state when the light source is off. At step 320 a leak current is generated so that during the second state the leak current flows through the light source. The leak current may be generated actively or passively.

Figure 4:
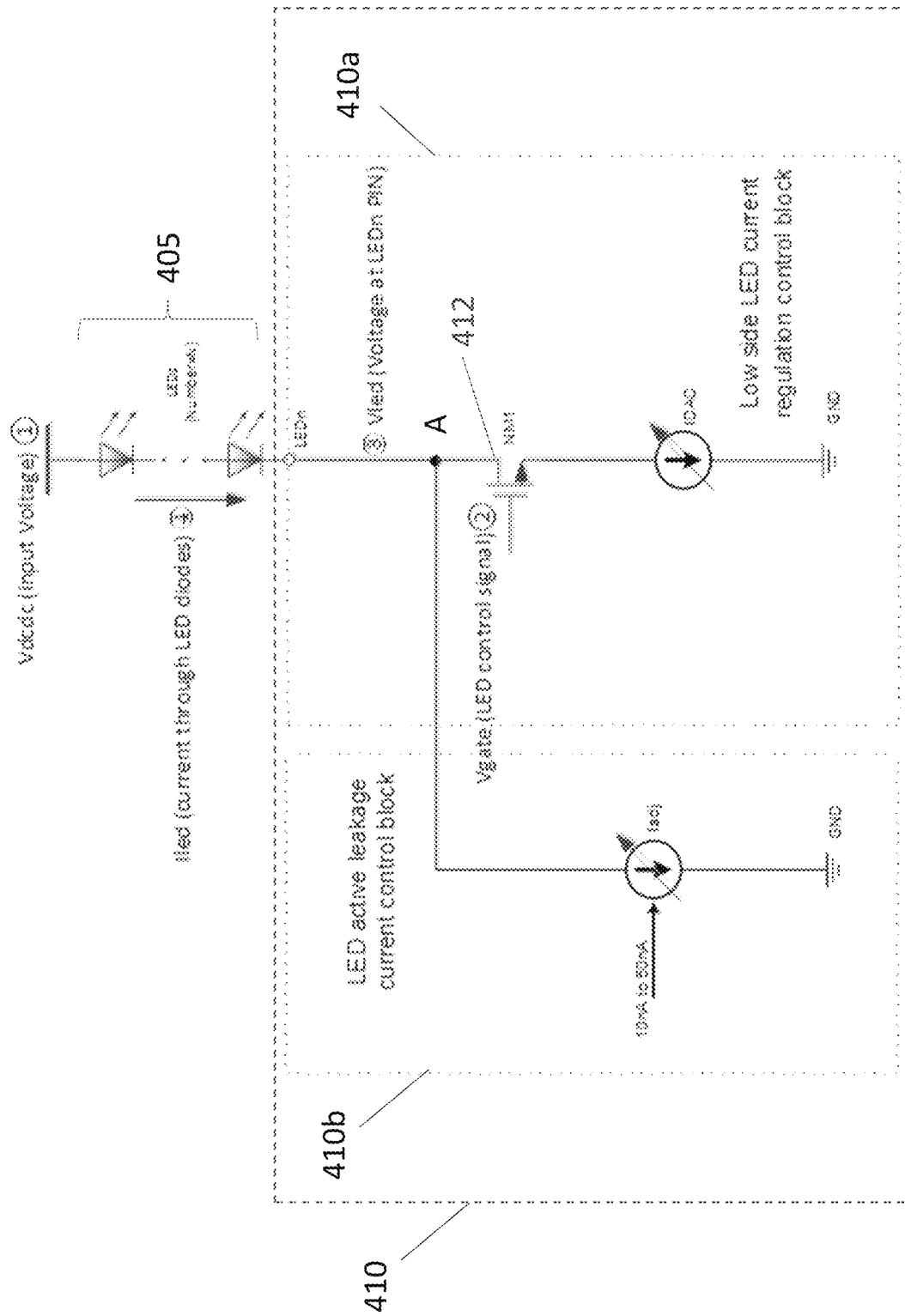
FIG. 4 is a diagram of a driver circuit for implementing the method of FIG. 3.

FIG. 4 is a diagram of a driver circuit for implementing the method of FIG. 3.

In this example the light source is provided by a semiconductor light source implemented as a string of light-emitting diodes (LEDs) 405. The string of LEDs 405 has an input terminal (also referred to as positive terminal) for receiving a positive input voltage Vdcdc and an output terminal (also referred to as negative terminal) coupled to the LED driver 410.

The driver 410 has a first circuit 410a and a second circuit 420a. The first circuit 410a is adapted to control an amount of current Iled flowing through the light source 405 to switch the light source between a first state when the light source is on and a second state when the light source is off. The second circuit 410b is adapted to generate a leak current so that during the second state the leak current flows through the light source 405.

The first circuit 410a, also referred to as low side current regulation control circuit, includes a regulation switch (412) having a first terminal coupled to the output of the LED string at node A, a second terminal coupled to ground and a control terminal for receiving a control signal. The regulation switch (412) may be a power switch. In this example the regulation switch is implemented as an N-type metal-oxide-semiconductor field-effect (MOSFET) transistor NM1. The regulation switch NM1 (412) has a drain terminal coupled to the output terminal of the LED string 405 and a source terminal coupled to ground via a current DAC (IDAC).

The second circuit 410b, also referred to as leakage current circuit or current sink circuit, includes a variable current source having a first terminal coupled to the first terminal of the regulation switch (412) NM1 at node A and a second terminal coupled to ground. The second circuit 410b is therefore coupled in parallel with the first circuit portion 410a and provides a current path.

The second circuit 410b is adapted to provide an adjustable leakage current Iadj to control the voltage at node A. The leakage current may be adjustable within a pre-defined current range, for example between 10 nA to 50 nA.

The input voltage Vdcdc is provided by a voltage supply which may be a power converter such as buck or a boost converter. The input voltage Vdcdc should be high enough to forward bias the LEDs string.

In operation, the light source (in this case the LED diodes) alternate between ON and OFF states. During the ON state, each LED diode forward voltage is positive for instance about 3V; and during the OFF state, each LED diode drop voltage is about zero if the LED current is zero.

The circuit 410 has an output terminal at node A that is connected to the negative terminal of the LED string 405. The voltage Vled at node A can be expressed as the input voltage Vdcdc minus the voltage across the LED string 405. Therefore Vled can be derived for the ON and OFF states as follows:

$$Vled(\text{on}) = Vdcdc - N * Vf \text{(LED ON state), and}$$

$$Vled(\text{off}) = Vdcdc - N * Vdrop \text{(LED OFF state)}.$$

In the above equations Vf is the LED forward voltage during the ON state; Vdrop is the LED drop voltage during the OFF state; and N is the number of LED diodes connected in series in the LED string 405.

The leakage current Iadj is set to be small enough so that ILED will not cause noticeable illumination (i.e., noticeable by the human eye), but large enough so that the voltage Vled at the cathode end of the LED string 405 will be held below a threshold value to allow the use of a regulation switch (power switch) with a reduced voltage rating.

For example, in an LED string including 20 LEDs connected in series, the voltage supply may be Vdcdc=65V and Vf=3V. Based on system application test results, Vdrop is about 80% *Vf if the Iled is about 10 nA, and the LED diode luminous intensity is too small to be seen by human eye.

In this numerical example $$Vled(\text{on}) = 65 - 20 * 3 = 5 \text{ V and}$$

$$Vled(\text{off}) = 65 - 20 * 0.8 * 3 = 17 \text{ V}.$$

This is compared with a Vled(off) of 65V for the prior art of FIG. 1 since the Vdrop is about zero if LED current is zero. As a result the first circuit 410a can be implemented using components having a reduced voltage rating.

The circuit 410b provides a leakage current at all time, that is both during the ON state and the OFF state. It will be appreciated that in an alternative embodiment the driver 410 may be modified so that the leakage current is only provided during the OFF state.

Figure 5:
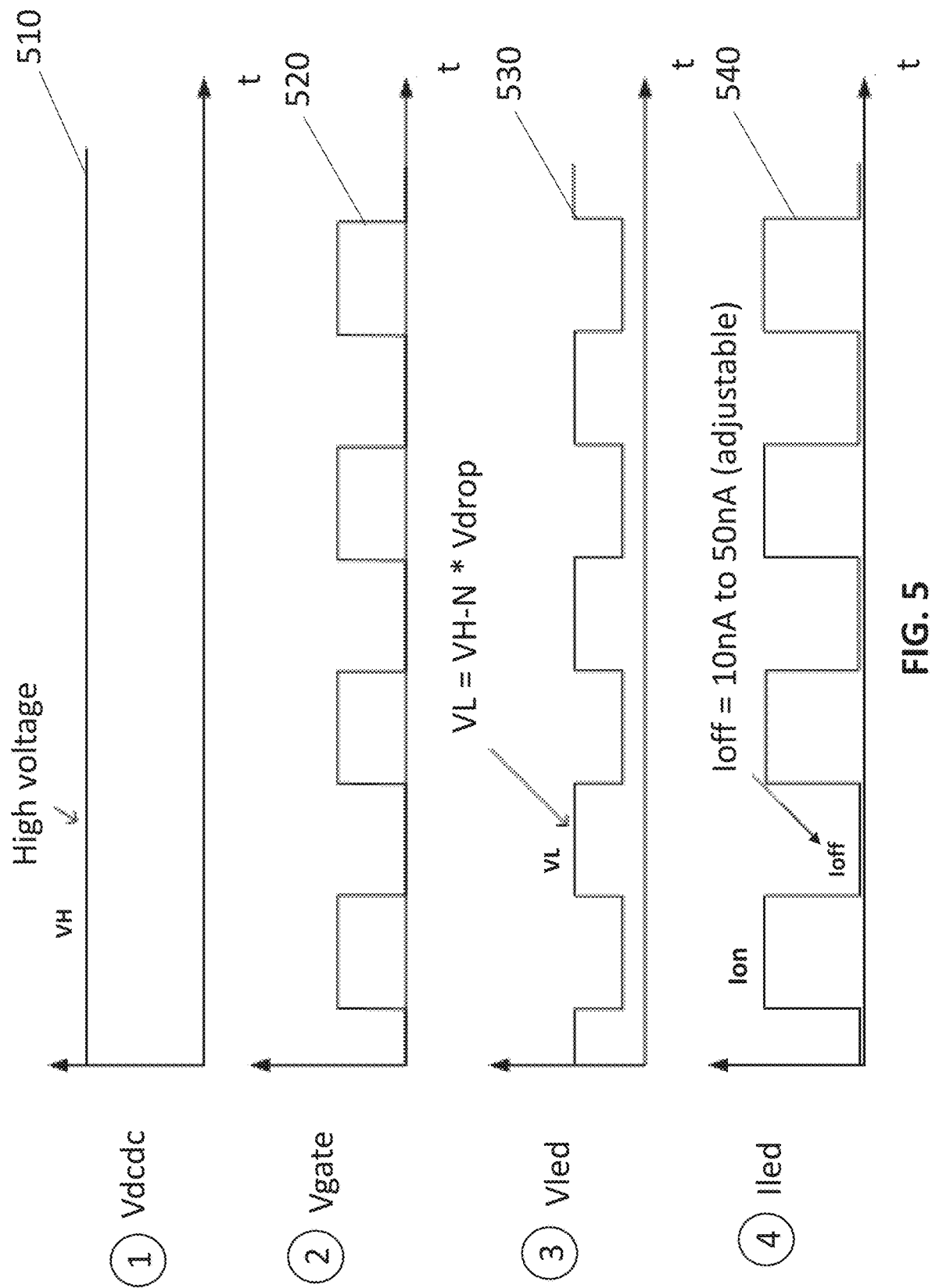
FIG. 5 is a waveform diagram illustrating the working of the driver of FIG. 4.

FIG. 5 is a waveform diagram illustrating the working of the driver of FIG. 4. FIG. 5 shows the input voltage Vdcdc 510, the gate voltage Vgate 520, the voltage Vled 530, and the LED current Iled 540. When Vgate=0, the light source is in the OFF state, Ioff is small but non nul (10 nA to 50 nA), and Vled=VH–N*Vdrop. As a result, the regulation switch (412) NM1 can be selected with a relatively low voltage rating, hence reducing the size of the first circuit 410a (low side current regulation control circuit). The voltage Vgate 520 may have pulse width modulated PWM controlled duty cycle.

Figure 6:
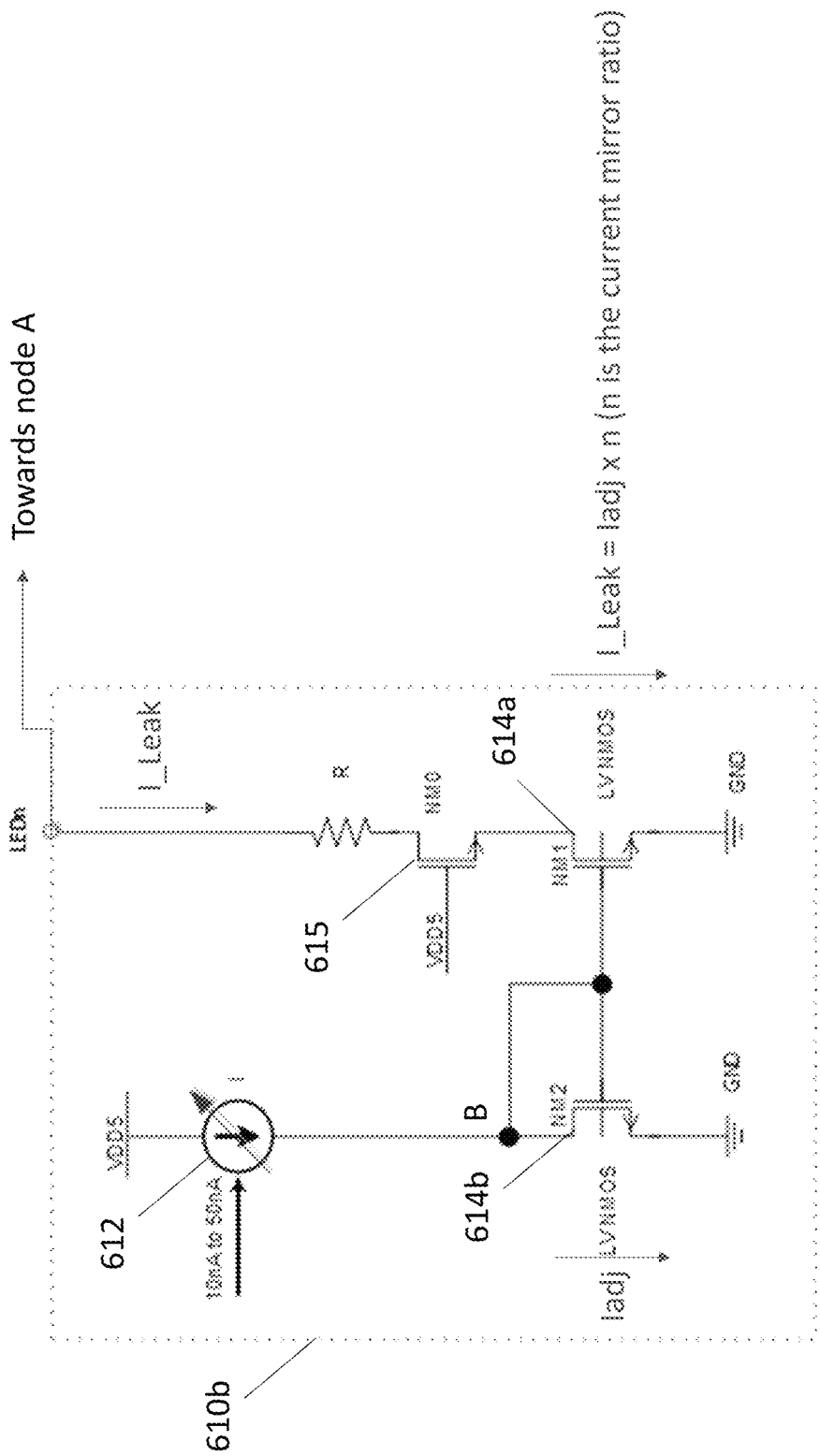
FIG. 6 is a diagram of a current sink circuit for use in the driver of FIG. 4.
Figure 7:
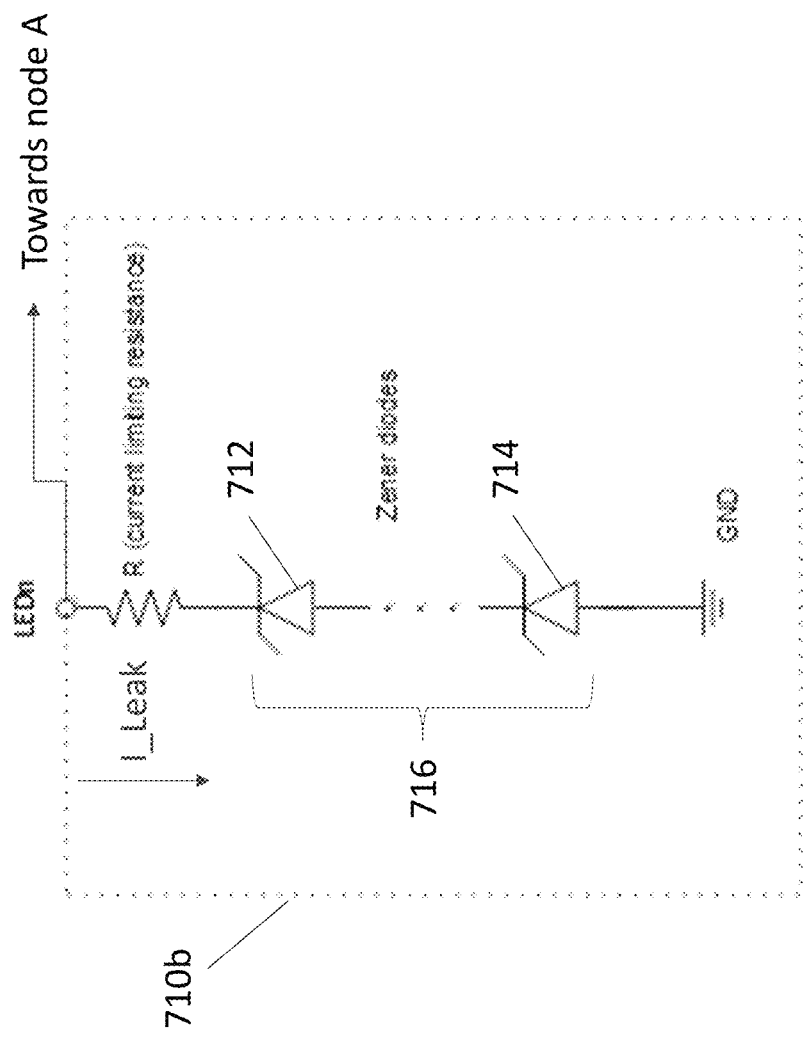
FIG. 7 is a diagram of another current sink circuit for use in the driver of FIG. 4.

The second circuit 410b is an adjustable current sink cell which may be implemented in various fashions. FIGS. 6 and 7 below provide two exemplary embodiments.

FIG. 6 is a diagram of a current sink circuit for use in the driver of FIG. 4. The circuit of FIG. 6 provides an example of how to generate a leak current I_leak actively using a current source. In this example the second circuit 610b (current sink/leakage current circuit) includes a variable current source 612 coupled to a current mirror formed by a pair of low voltage switches 614a and 614b. In this implementation the switches 614a and 614b are NMOS transistors NM1, NM2. The transistors NM1 and NM2 have a common gate that is connected to the drain of NM2 at node B. The drain of NM2 is coupled to the current source 612. The source terminals of NM1 and NM2 are coupled to ground. A clamping switch 615 may also be provided. The switch 615 has a first terminal, for instance a drain terminal coupled to a resistance R, and a second terminal for instance a source terminal coupled to the drain of NM1. The clamping switch 615 may be implemented as an N-type MOSFET (NM0) with a gate connected to VDD5 (for instance a 5V voltage).

In operation, the current provided by the variable current source 612 is adjusted to a given value Iadj for instance between 10 nA and 50 nA. The current Iadj provided by 612 flows through 614b NM2. If the switches NM1 and NM2 are the same then the current Iadj also flows through 614a NM1, otherwise a mirror current that depends on the ratio NM1/NM2 flows through NM1. By varying Iadj the circuit controls the voltage Vled at node A. In addition, a clamping switch 615 may also be used to clamp the voltage at node A (drain of the regulation switch (412)). The switch 615 receives the control voltage VDD5 to clamp the voltage at the first terminal of the regulation switch (node A) below VDD5. In this example the drain of the regulation switch (412) is clamped below 5V regardless of the maximum voltage VLED max at the cathode terminal of the LED string (LEDn pin). Therefore the circuit 610b generates the leak current I_leak that flows through the light source 405 during the second state (OFF state). The leak current I_leak is based on the adjustable current Iadj. If NM1 and NM2 are identical then I_Leak is the same as Iadj. More generally I_leak=n*Iadj, in which n is the current mirror ratio.

The current sink circuit 610b may be modified. For instance the switches 614a and 614b may be different from each other, in which case the current flowing through them would also be different. It is also possible to implement the circuit 610b without the clamping switch 615. For instance, if the regulation switch (412) has a break voltage rating higher than VLED max, then there is no need for the clamping switch 615.

FIG. 7 is a diagram of another current sink circuit for use in the driver of FIG. 4. The circuit of FIG. 7 provides an example of how to generate a leak current I_leak passively (without using a current source). The driver 710 includes a set of Zener diodes 716 coupled to a current limiting resistance R. The set of Zener diodes 716 has a plurality of Zener diodes connected in series. The first Zener diode 712 is coupled to the resistance R and the last Zener diode 714 in the set is connected to ground.

Each Zener diode has a breakdown voltage referred to as Zener voltage Vz. The number of Zener diodes can be adjusted to achieve a desired overall breakdown voltage Vztotal for the set of Zener diodes, and therefore adjust the leakage current automatically. The resistance R can also be selected to adjust the voltage Vled.

In operation the resistance R drops the voltage Vled at node A (cathode terminal of the LED string) so that Vled is low enough to protect the driver circuit but high enough to prevent noticeable illumination of the LED string.

In the second state when the light source is off the voltage across the LED string (Vdcdc−Vztotal) should not cause noticeable illumination.

It will be appreciated that current sink circuits could be implemented in other ways to provide the adjustable current leakage function. The driver of the disclosure can be used for driving a light source, such as a semiconductor light source, in various applications including classic lighting, backlighting applications, LED signage application, LED display application etc. . . .

Figure 8:
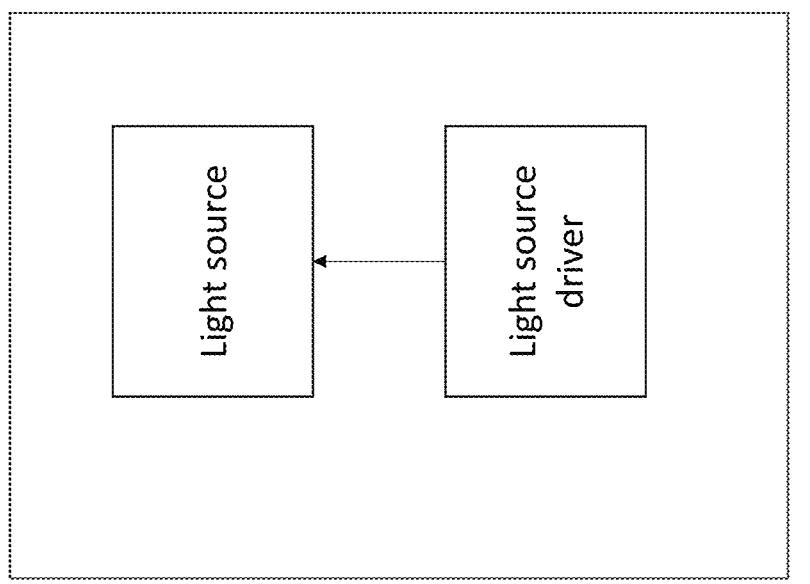
FIG. 8 is a diagram of a device comprising a driver according to the disclosure.

FIG. 8 is a diagram of a device such as a lamp. The device 800 includes a driver 810 coupled to a light source 805 such as an LED or a string of LEDs.

The driver 810 may be implemented as described above with reference to FIGS. 4-7. The driver of the disclosure can be used in various other applications including backlighting applications, for instance in an LED screen display.

A skilled person will therefore appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A driver for use with a light source, the driver comprising
   a first circuit adapted to control an amount of current flowing through the light source to switch the light source between a first state when the light source is on and a second state when the light source is off; and
   a second circuit adapted to generate a leak current so that during the second state the leak current flows through the light source;
   wherein the first circuit comprises a regulation switch having a first terminal coupled to the second circuit and connectable to an output terminal of the light source; and wherein in the second state a voltage at the first terminal is less than a threshold value.

2. The driver as claimed in claim 1, wherein the leak current is less than a threshold value such that the light source remains off in the second state.

3. The driver as claimed in claim 1, wherein the regulation switch is coupled to a current digital to analog converter.

4. The driver as claimed in claim 3, wherein the regulation switch has a second terminal coupled to the current digital to analog converter, and a control terminal.

5. The driver as claimed in claim 1, wherein the second circuit is coupled in parallel with the first circuit.

6. The driver as claimed in claim 1, wherein the second circuit comprises a current source coupled to a current mirror.

7. The driver as claimed in claim 6, wherein the current mirror comprises a first switch coupled to the current mirror and a second switch coupled to a resistance.

8. The driver as claimed in claim 6, wherein the second circuit comprises a clamping switch coupled to the current mirror.

9. The driver as claimed in claim 1, wherein the second circuit comprises a plurality of Zener diodes coupled in series.

10. The driver as claimed in claim 9, wherein the second circuit comprises a resistance coupled to the plurality of Zener diodes.

11. A device comprising a driver as claimed in claims 1 coupled to a light source.

12. The device as claimed in claim 11, wherein the light source is a semiconductor light source.

13. The device as claimed in claim 12, wherein the device is a display device comprising a plurality of semiconductor light sources, each semiconductor light source among the plurality of light sources being coupled to a corresponding driver.

14. A method of driving a light source, the method comprising
- controlling, using a first circuit, an amount of current flowing through the light source to switch the light source between a first state when the light source is on and a second state when the light source is off; and
- generating, using a second circuit, a leak current so that during the second state the leak current flows through the light source;
- wherein the first circuit comprises a regulation switch having a first terminal coupled to the second circuit and connectable to an output terminal of the light source; and wherein in the second state a voltage at the first terminal is less than a threshold value.

15. The method as claimed in claim 14, wherein the leak current is generated actively.

16. The method as claimed in claim 14, wherein the leak current is generated passively.

* * * * *